(12) United States Patent
Corey

(10) Patent No.: US 6,492,748 B1
(45) Date of Patent: Dec. 10, 2002

(54) RECIPROCATOR AND LINEAR SUSPENSION ELEMENT THEREFOR

(75) Inventor: John A. Corey, Melrose, NY (US)

(73) Assignee: Clever Fellows Innovation Consortium, Inc., Troy, NY (US)

(*) Notice: Subject to any disclaimer, the term of this patent is extended or adjusted under 35 U.S.C. 154(b) by 0 days.

(21) Appl. No.: 09/591,480

(22) Filed: Jun. 9, 2000

(51) Int. Cl.$^7$ ............................. F16F 1/22; F16F 1/26; H02K 7/08

(52) U.S. Cl. ..................... 310/17; 310/12; 92/84; 267/171; 60/520

(58) Field of Search ..................... 310/13, 15, 17, 310/20, 22, 34; 92/84; 267/161, 105, 109, 160; 60/520; 340/407.1; 248/316.7; 361/160; 335/251, 255, 257, 262, 270, 277

(56) References Cited

U.S. PATENT DOCUMENTS

| | | | |
|---|---|---|---|
| 3,727,900 A | * 4/1973 | Casey | 267/160 |
| 4,238,845 A | 12/1980 | Haggard et al. | 367/183 |
| 4,239,997 A | * 12/1980 | Popov et al. | 310/13 |
| 4,428,460 A | 1/1984 | Luinstra | 187/411 |
| 4,435,661 A | * 3/1984 | Witten | 310/90 |
| 4,471,254 A | * 9/1984 | Yamada et al. | 310/242 |
| 5,139,242 A | 8/1992 | Yarr | 267/160 |
| 5,146,123 A | 9/1992 | Yarr | 310/15 |
| 5,389,844 A | 2/1995 | Yarr et al. | 310/15 |
| 5,456,082 A | 10/1995 | Keolian et al. | 62/6 |
| 5,522,214 A | 6/1996 | Beckett et al. | 60/517 |
| 5,682,132 A | * 10/1997 | Hiroyoshi et al. | 340/407.1 |
| 6,046,884 A | 4/2000 | Crane | 360/244.2 |
| 6,208,497 B1 | * 3/2001 | Seale et al. | 361/160 |

OTHER PUBLICATIONS

"HOTS to WATTS: The FPSE Linear Alternator System Re-Invented," John A. Corey and George A. Yarr, 27th Proceedings of the Intersociety of Energy Conversion Engineering Conference, Aug. 1992.

"Method of Aligning Bores in Piston and Displacer Cylinders of Free-Piston Stirling Engine," John A. Corey, made public Sep. 1996.

* cited by examiner

Primary Examiner—Nestor Ramirez
Assistant Examiner—Judson H. Jones
(74) Attorney, Agent, or Firm—Hoffman, Warnick & D'Alessandro LLC; Spencer K. Warnick

(57) ABSTRACT

A linear suspension element having preloaded legs that reduce fretting and maximize stroke within allowable stress limits. Also, a reciprocator and suspension including the linear suspension element.

22 Claims, 10 Drawing Sheets

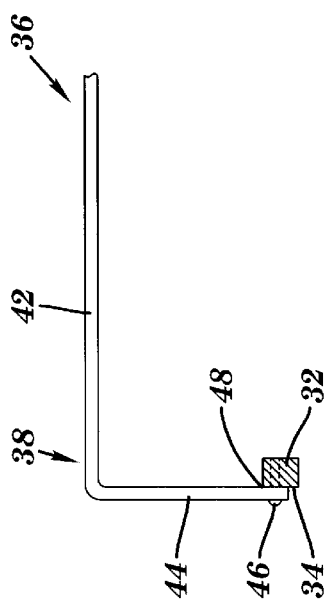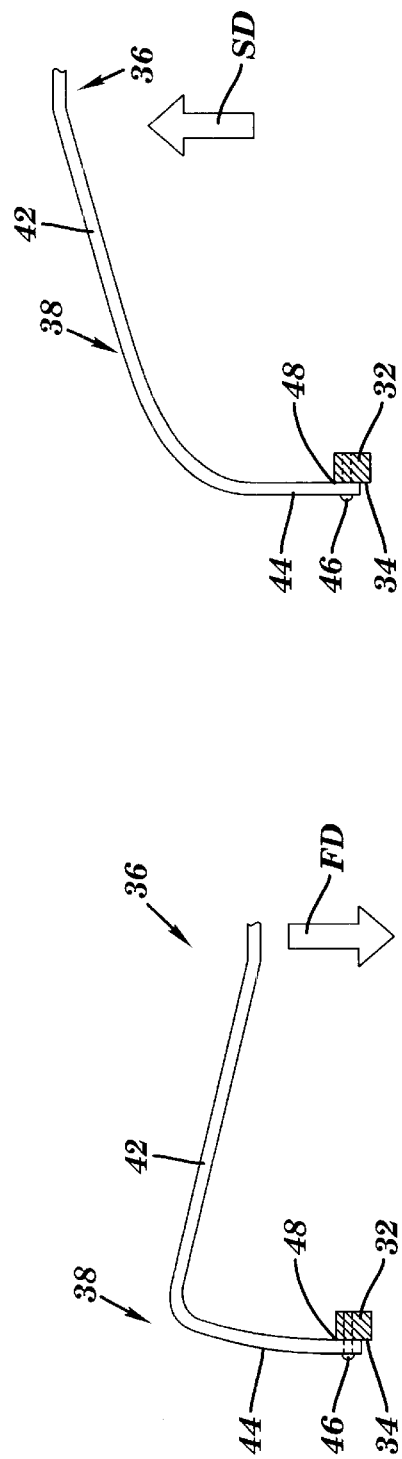

RECIPROCATOR AND LINEAR SUSPENSION ELEMENT THEREFOR

BACKGROUND OF THE INVENTION

1. Technical Field

The present invention relates generally to a linear suspension element and, more particularly, to a linear suspension element for long-life reciprocation along a line of motion. The invention also relates to a reciprocator and linear suspension including the linear suspension element.

2. Related Art

There are a variety of linear suspensions available to constrain movement of a moving element in a linear motor or reciprocator. These suspensions are analogous to bearings in rotary devices because they restrict a moving element to primarily move in the operationally useful sense and prevent motion in other directions. Additional objectives of a linear suspension (as opposed to linear bearings) are to provide long-life reciprocation with no friction or wear.

U.S. Pat. No. 5,522,214 to Beckett et al. discloses an exemplary spiral suspension for a reciprocator. This suspension spirally expands to allow its center to move perpendicularly to the spiral plane. It resists radial movement to limit linear motion of a moving element to a single axis perpendicular to the spiral plane.

A problem with spiral suspensions is their inducement of a torsional motion about the reciprocation axis. This motion may cause vibration and failure and requires the moving element to be circular in section, or have excessive clearances to the stationary elements of an assembly in order not to collide with the stationary elements during operation. Accordingly, spiral suspensions are useless with "STAR" reciprocators in which the moving element and stationary elements mate in a generally non-circular manner. In "STAR" reciprocators, the suspension must exhibit substantial torsional stiffness as well as radial stiffness.

Strap suspensions, such as described incidentally in U.S. Pat. No. 5,389,844, have been developed for "STAR" reciprocators. In these suspensions, tensile stresses experienced by legs, or flexure elements, of the strap are transferred to bending stresses in the vertically mounted ends of the legs. A problem with these suspensions, however, is that users do not adequately monitor fretting that may occur on the ends of the flexure elements where they are clamped. Furthermore, the clamping of the legs to the mount is mechanically cumbersome.

In view of the foregoing there is a need in the art for a suspension element capable of withstanding operational and non-axial stresses and providing longer life. Further, there is a need for a reciprocator and suspension having the same characteristics.

SUMMARY OF THE INVENTION

The invention provides an improved linear suspension element and a reciprocator using the linear suspension element. The suspension element includes preloaded legs connecting a moving element to a static element of the reciprocator. The preloads substantially reduce fretting, simplify the mechanical coupling structure, provide longer life and maximize stroke within allowable stress limits.

A first aspect of the invention provides a linear suspension element for a moving element, the suspension element comprising: a mount; a plurality of preloaded legs each having a first portion for coupling to a moving element, and a second portion coupled to the mount.

A second aspect provides a reciprocator comprising: a linear drive mechanism for linearly moving a moving element; at least one linear suspension element operatively coupled to the linear drive mechanism, each linear suspension element having: a mount; a plurality of legs each having a first portion for coupling to a moving element, and a second portion coupled to the mount; and wherein each leg includes a preload.

The invention also includes, in a third aspect, a linear suspension for a moving element of a reciprocator having a linear drive mechanism for the moving element, the suspension comprising: a first mount coupled to the linear drive mechanism; a plurality of preloaded legs each having a first portion coupled to the moving element, and a second portion coupled to the first mount; a second mount coupled to the linear drive mechanism; and a plurality of preloaded legs each having a first portion coupled to the moving element, and a second portion coupled to the second mount.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein:

FIGS. 4A–4C show details of flexing movement of one leg of the linear suspension element of FIG. 2;

DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiments.

Figure 1:
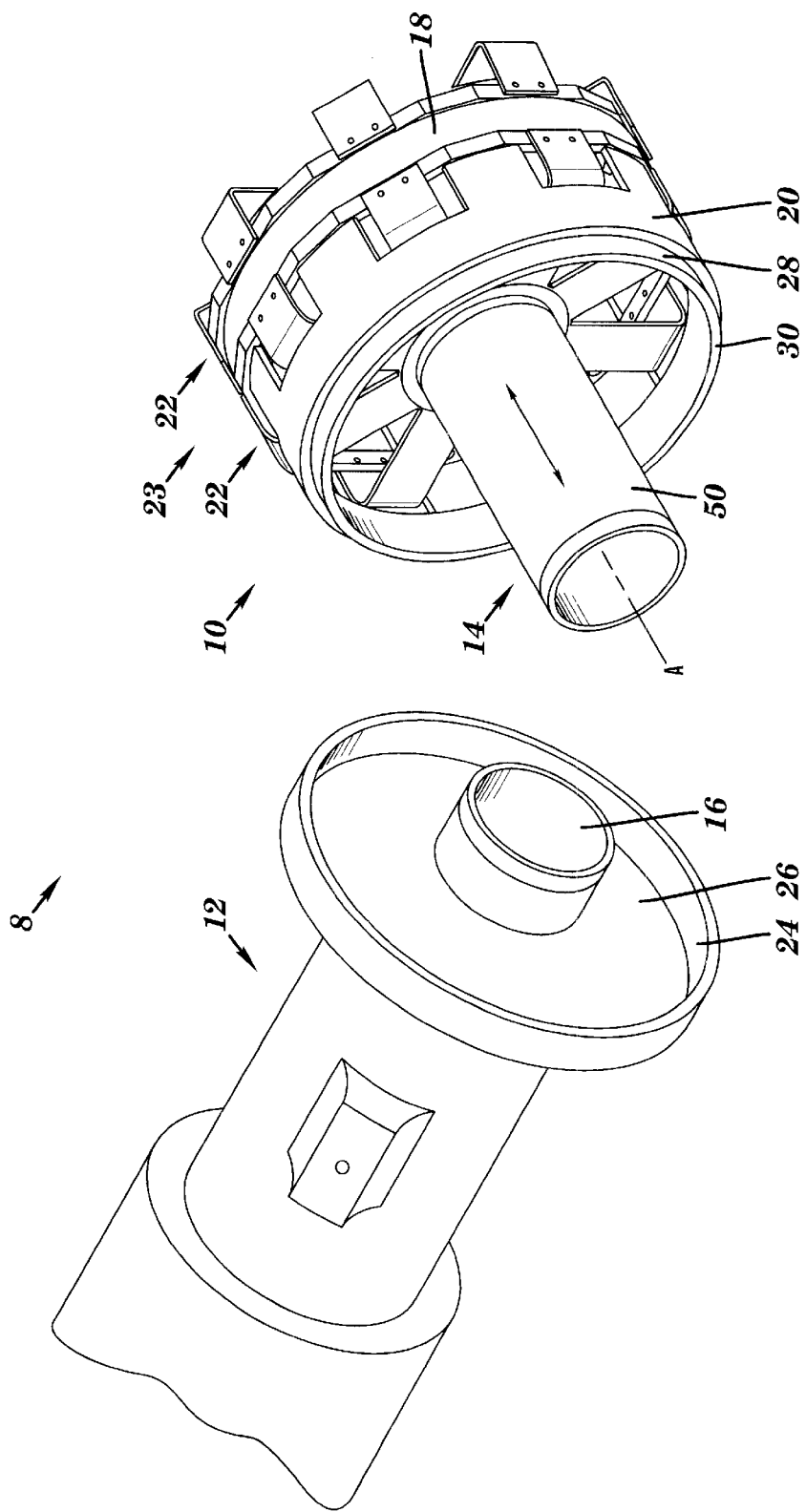
FIG. 1 shows a reciprocator assembly in accordance with the invention.

Referring to FIG. 1, a reciprocator assembly 8 is shown that includes a reciprocator 10 and a mating cylinder assembly 12. In operation, reciprocator 10 and cylinder assembly 12 are assembled such that a moving element 14 of reciprocator 10 is linearly movable along an axis A of reciprocator 10 and in a close-clearance relation in a cylinder bore 16 of cylinder assembly 12. Reciprocator 10 includes moving element 14 and a linear drive mechanism or motor 18, similar to that disclosed in U.S. Pat. Nos. 5,389,844 and 5,139,242, which are hereby incorporated by reference. Reciprocator 10 may also include a reciprocator casing 20, sometimes called a crown ring. Linear drive mechanism 18 includes at least one, and preferably two, linear suspension elements 22 that form a linear suspension 23 and, as will be recognized by one with skill in the art, a plunger and a stator (not shown). Linear suspension 23 allows reciprocation and substantially restricts non-axial motion, e.g., torsional, rotational and/or radial motion, of moving element 14 relative to reciprocator 10, i.e., it restricts any motion except that along reciprocation axis A. Moving element 14 is sometimes referred to as a piston because it is the power transmitting element of reciprocator 10.

Cylinder assembly 12 is the interface between reciprocator 10 and a wide range of machines recognizable to one having ordinary skill in the art. A few examples of machines are: free-piston Stirling engines, thermoacoustic engine-generators, free-piston cryocoolers, gas-cycle refrigeration machines, pulse tube drivers, and gas compressors. In the example shown, the cylinder assembly 12 is for a twin motor pulse tube driver in which a reciprocator 10 is coupled to each end of cylinder assembly 12 (only one is shown for simplicity).

In any setting, cylinder assembly 12 preferably includes a number of structures for interfacing with reciprocator 10 including: cylinder bore 16, a pilot bore 24 and a cylinder face 26. Reciprocator 10, or reciprocator casing 20, includes a pilot 28 that mates with pilot bore 24 and an end or pilot face 30 that mates face-to-face with cylinder face 26. The details of assembly will be discussed in more detail relative to FIGS. 7–10.

Figure 2:
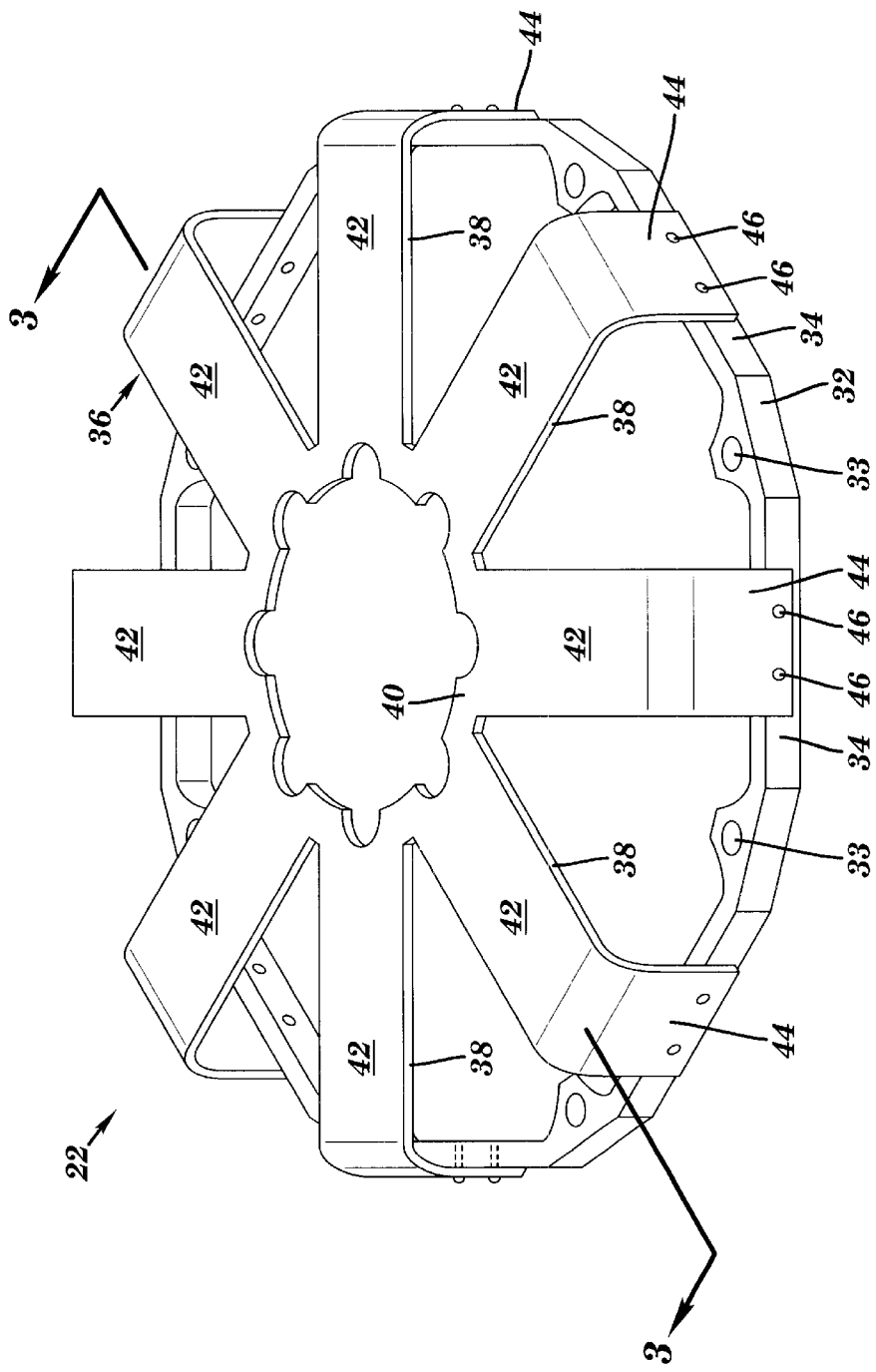
FIG. 2 shows a linear suspension element in accordance with the invention.
Figure 6:
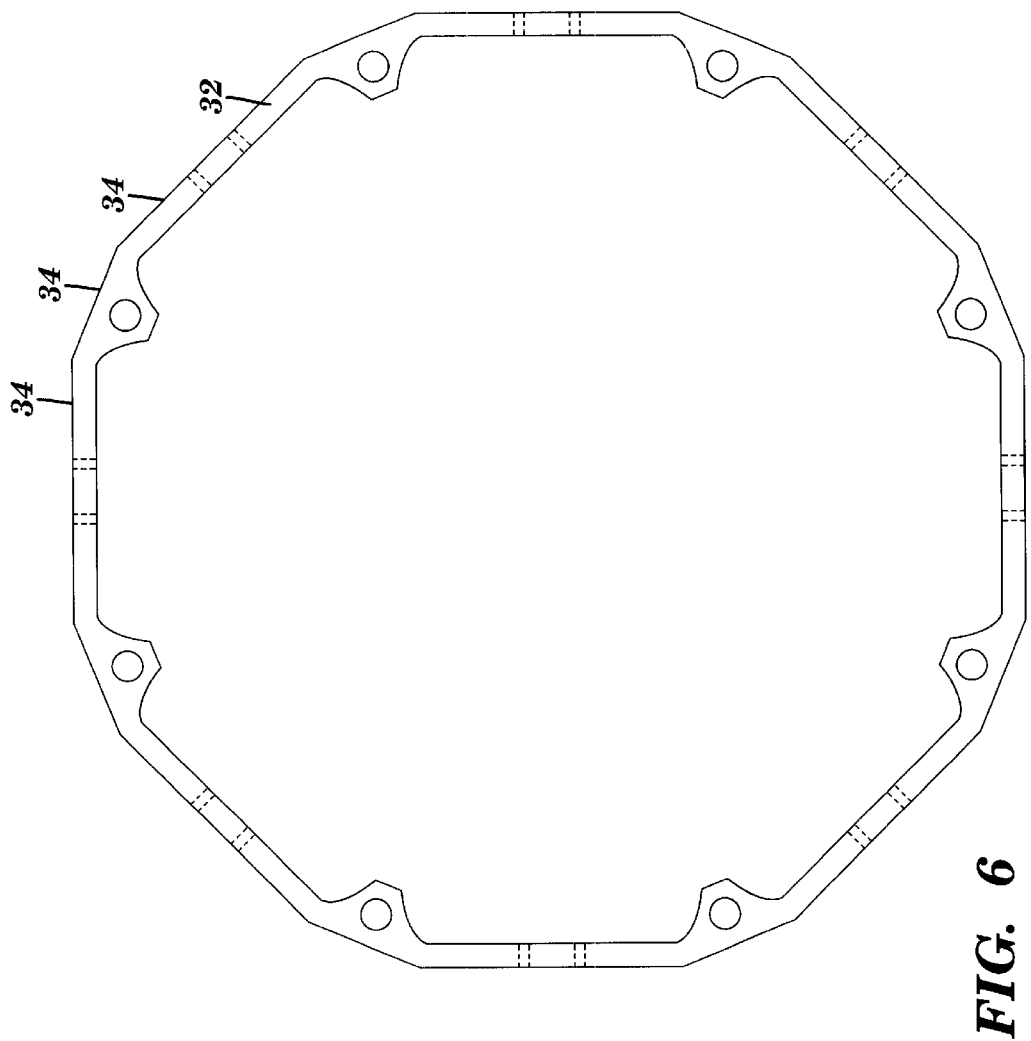
FIG. 6 shows a detail of a mount of the linear suspension element of FIG. 2.

Linear suspension element 22 limits motion of moving element 14 along a reciprocation axis A during operation of reciprocator 10. Referring to FIGS. 2 and 6, linear suspension element 22 includes a suspension mount 32, preferably in the form of a ring having sides 34. Linear suspension element 22 also includes a suspension strap assembly 36, to be described in more detail below. Mount 32 also includes mounting holes 33. It should be recognized that mount 32 may take a variety of forms other than the sided ring configuration and not depart from the teachings of the invention.

Suspension strap assembly 36 includes a number of legs, or flexure elements, 38 extending substantially radially from a hub 40. Legs 38 are preferably made from fatigue-resistant, high strength tempered steel, such as AISI 1095, SS316 or, preferably, UHB 716 from Uddeholm Corp. Each leg 38 is formed to have a first substantially radial portion 42 and a second substantially axial portion 44. Axial portion 44 is typically shorter than radial portion 42 for reasons that will become more apparent below. Each axial portion 44 is coupled to mount 32 by at least one, and preferably two, rivet(s) 46. If only one rivet 46 is used, other restraints may be required to prevent leg rotation about the single rivet.

Each axial portion 44 is provided to dissipate the tensile forces applied to their respective radial portion 42 applied during reciprocation of moving element 14. In particular, an axial portion 44 acts to transform tensile stress in a respective radial portion 42 to bending stress in that axial portion 44. The optimal length of portions 42, 44 is determined by many factors such as the amount of stress allowed for a desired stroke of suspension element 22, the width and thickness of legs 38, etc. Such detailed dimensions are best determined by finite element stress analysis of proposed designs.

To form reciprocator 10, hub 40 is coupled to a hub mounting 60 (shown in FIG. 7) that is coupled to moving element 14 in a known fashion. Mount(s) 32 is coupled to linear drive mechanism 18, or other immovable structure of reciprocator 10, in a known fashion, e.g., by bolts through mounting holes 33. In the reciprocator shown in FIG. 1, two linear suspension elements 22, one on each side of linear drive mechanism 18, are required to form linear suspension 23 and to guide moving element 14 along reciprocation axis A. Reciprocator casing 20 may be machined to accommodate one suspension element 22 inboard.

Figure 3:
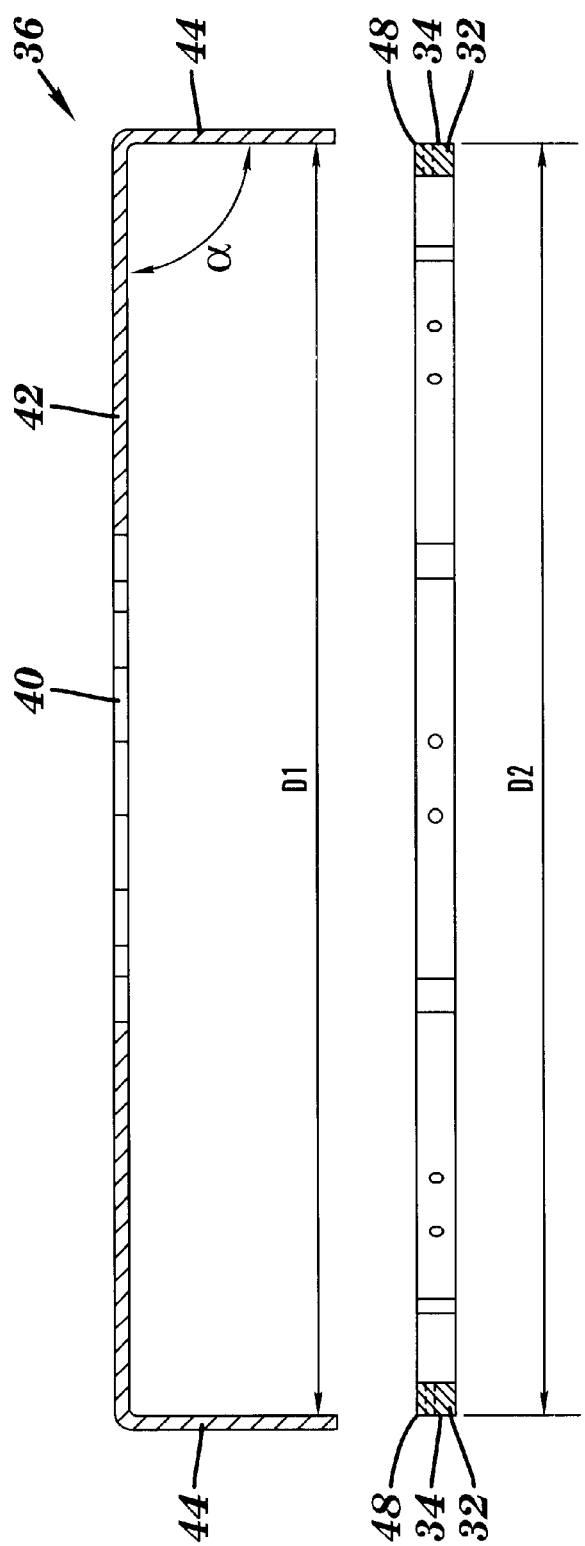
FIG. 3 shows a cross-sectional view along line 3—3 of FIG. 2 with the components disassembled.

Referring to FIGS. 3 and 4A–4C, linear suspension element 22 is shown disassembled. In FIG. 4A, strap assembly 36 is shown at a rest position, i.e., reciprocator 10 is not in operation, and assembly 36 is substantially midway between its allowable extreme positions shown in FIGS. 4B and 4C. As shown in FIG. 3, radial portion 42 of each leg 38 is preferably formed at an angle $\alpha$ of approximately 90° relative to axial portion 44 of the same leg 38. In a preferred embodiment, linear suspension element 22 may include a first preload to prevent separation of an axial portion 44 and mount 32 at a fulcrum edge 48 of mount 32. Separation would otherwise occur when legs 38 distort during reciprocator 10 operation. This first preload is provided, as shown in FIG. 3, by having an inner distance D1 between any two opposing axial portions 44 less than an outer distance D2 between any two opposing sides 34 of mount 32 to which axial portions 44 are coupled. This set up can be provided by forming inner distance D1 on suspension strap assembly 36 between any two opposing axial portions 44 less than an outer distance D2 between any two opposing sides 34 of mount 32. In one preferred embodiment, inner distance D1 is set about 1% less than outer diameter D2. Alternatively stated, mount 32 may be formed such that opposing sides 34 are wider than inner distance D1. Once suspension strap assembly 36 is assembled, each axial portion 44 thus includes a preload bend over fulcrum edge 48 of mount 32. It should be recognized that while suspension strap assembly 36 is shown with an even number of legs 38, and mount 32 with an even number of sides 34, that an odd number of legs 38 and sides 34 may also be provided. In this case, the average inner diameter of strap assembly 36 may be configured to be less than an average outer diameter of mount 32 to form the desired preload.

The first preload provides a number of advantages. First, regardless of the direction of movement of suspension element 22, the amount of fretting on axial portion 44 by fulcrum edge 48 is reduced. To further explain, moving element 14 and suspension element 22 move between two extreme positions, which are shown relative to suspension element 22 in FIGS. 4B and 4C. FIG. 4B shows a leg 38 of suspension element 22 in a first extreme position in which moving element 14 has moved in a first direction, indicated by arrow FD, through mount 32. Because of the first preload, legs 38 and, in particular, axial portion 44 deform such that they do not pull away from fulcrum edge 48 of mount 32 at any time. As a result, fretting on second portion 44 is reduced. Similarly, FIG. 4C shows a leg 38 of suspension element 22 in a second extreme position in which moving element 14 has moved in a second direction, indicated by arrow SD, opposite first direction FD and away from mount 32. In this position, legs 38 and, in particular, axial portion 44 intrinsically deform such that they do not pull away from fulcrum edge 48 of mount 32. Maintaining contact of axial portions 44 and mount 32, at or near fulcrum edges 48, at all times during operation precludes wear or fretting of either axial portion 44 or mount 32 that would otherwise be caused by their relative movement. Accordingly, suspension element 22 lasts longer.

A second advantage of the first preload is that the need for a complex clamping mechanism for axial portions 44, such as that disclosed in U.S. Pat. No. 5,389,844, is removed. For instance, normally in the extreme position shown in FIG. 4B, axial portion 44 would be forced away from fulcrum edge 48 and would require some mechanism to restrain it from doing so, e.g., clamping blocks as shown in U.S. Pat. No. 5,389,844. However, because of the presence of the first preload, no clamping mechanism is required.

Figure 5:
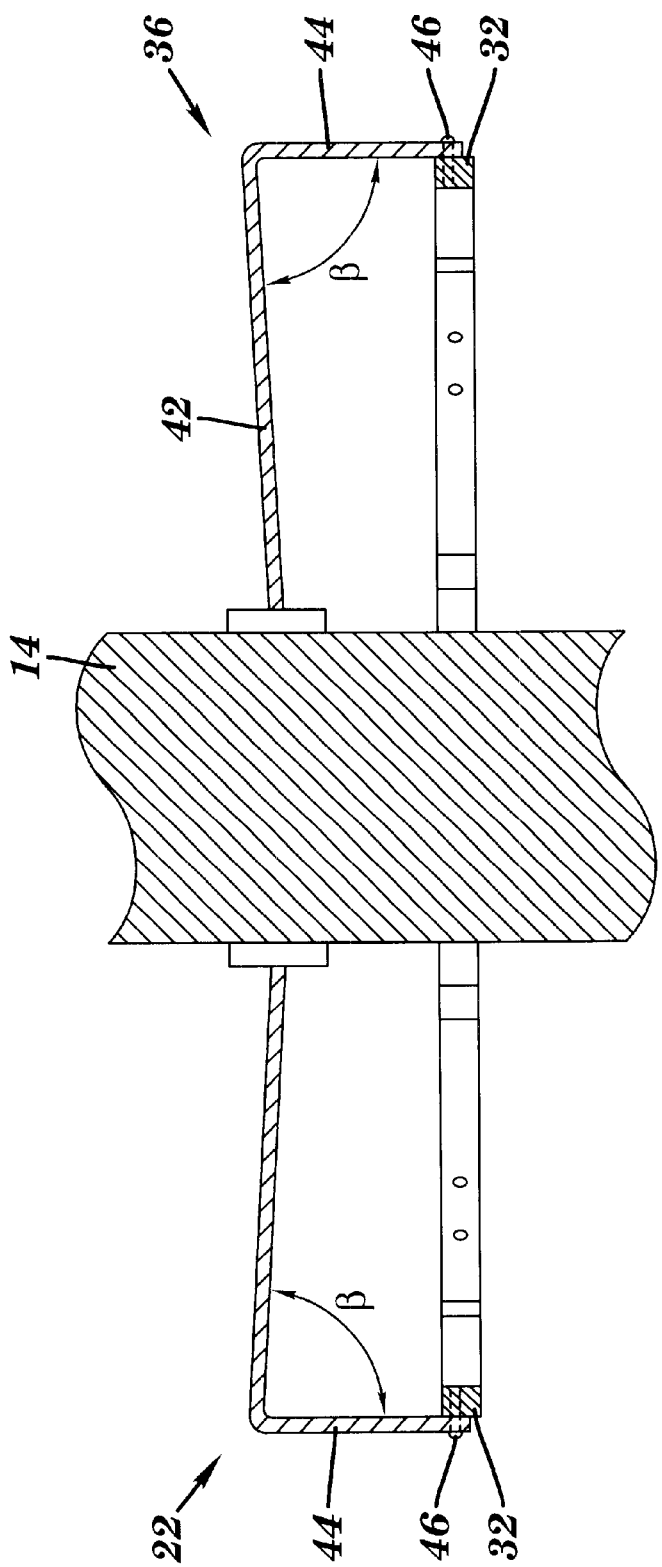
FIG. 5 shows a cross-sectional view of a detail of a mounted linear suspension element of FIG. 2.

Returning to FIGS. 4B–4C, extension of legs 38 caused by movement in second direction SD (FIG. 4C) raises stress more rapidly than compression by movement in first direction FD (FIG. 4B). If a suspension reciprocates by equal amounts in both first direction FD and second directions SD relative to a relaxed position, the total stroke range will be limited by stress levels induced during movement in second direction SD, although further movement without overstress would be possible in first direction FD if not accompanied by further movement in second direction SD. Total allowable stroke range could be increased if such an unequal range of motion in first direction FD and second direction SD, respectively, could be employed. To address this situation, as shown in FIG. 5, linear suspension element 22 may also include a second preload. The second preload is preferably created by coupling suspension strap assembly 36 to moving element 14 with a slight elastic bend towards mount 32, i.e., such that axial portion 44 and radial portion 42 are set at an angle β less than angle of forming α. Angle β is preferably less than 90°. This second preload provides a more balanced stress range in legs 38 during reciprocation. Accordingly, when moving element 14 moves in second direction SD, more extension relative to the installed preload position can be accommodated before exceeding the fatigue stress limits of the suspension material. As a result, suspension element 22 can operate with a greater total stroke range than if motion in second direction SD were centered about a non-preloaded position. It should be recognized that where two linear suspensions 22 are used, both can include a second-type preload. In this instance, a moving element 14 may be used that is positioned, or includes coupling structure, that draws together opposing hubs 40 of strap assemblies 36 simultaneously providing second-type preload to both suspensions 22 without offsetting the rest position of moving element 14 with respect to linear drive mechanism 18.

The first and second preloads may be provided together or individually. Furthermore, it should be recognized that other mechanisms of establishing the preloads may also be provided and not depart from the present invention.

An advantage of a linear suspension element such as that described above (or a suspension that includes one) is the substantial prevention of non-axial motion it provides. Such resistance to non-axial motion is especially beneficial regarding improved methods of constructing a reciprocator 10 and moving element 14, and improved methods of producing non-contacting alignment of relative moving elements, in accordance with a second preferred embodiment of the invention. The improved methods are made possible, in part, by the torsionally and radially stiff linear suspension described in U.S. Pat. No. 5,389,844, and/or by the refined linear suspension element 22 described above.

Returning to FIG. 1, it is a requirement of most linear motor driven systems that moving element 14 is substantially coaxial with cylinder bore 16 so that the system can operate with moving element 14 in close clearance relation to cylinder bore 16 without lubrication. There are a number of factors that control the level of coaxial alignment of moving element 14 and cylinder bore 16. Among them are the alignment of reciprocator 10 and cylinder assembly 12, and the concentricity of moving element 14 and pilot 28. Additionally, the perpendicularity of pilot face 30 and moving element 14 affects the co-axiality of moving element 14 and cylinder bore 16.

Typically, in order to assure co-axiality of components sufficient for close-clearance operation, very precise machining of individual parts must be provided. By "machining" is meant the "finishing," "cutting," or "tooling" of parts to desired dimensions. The high precision required when individual components are machined to fit into a close-clearance assembly is expensive and oftentimes unreliable.

Figure 7:
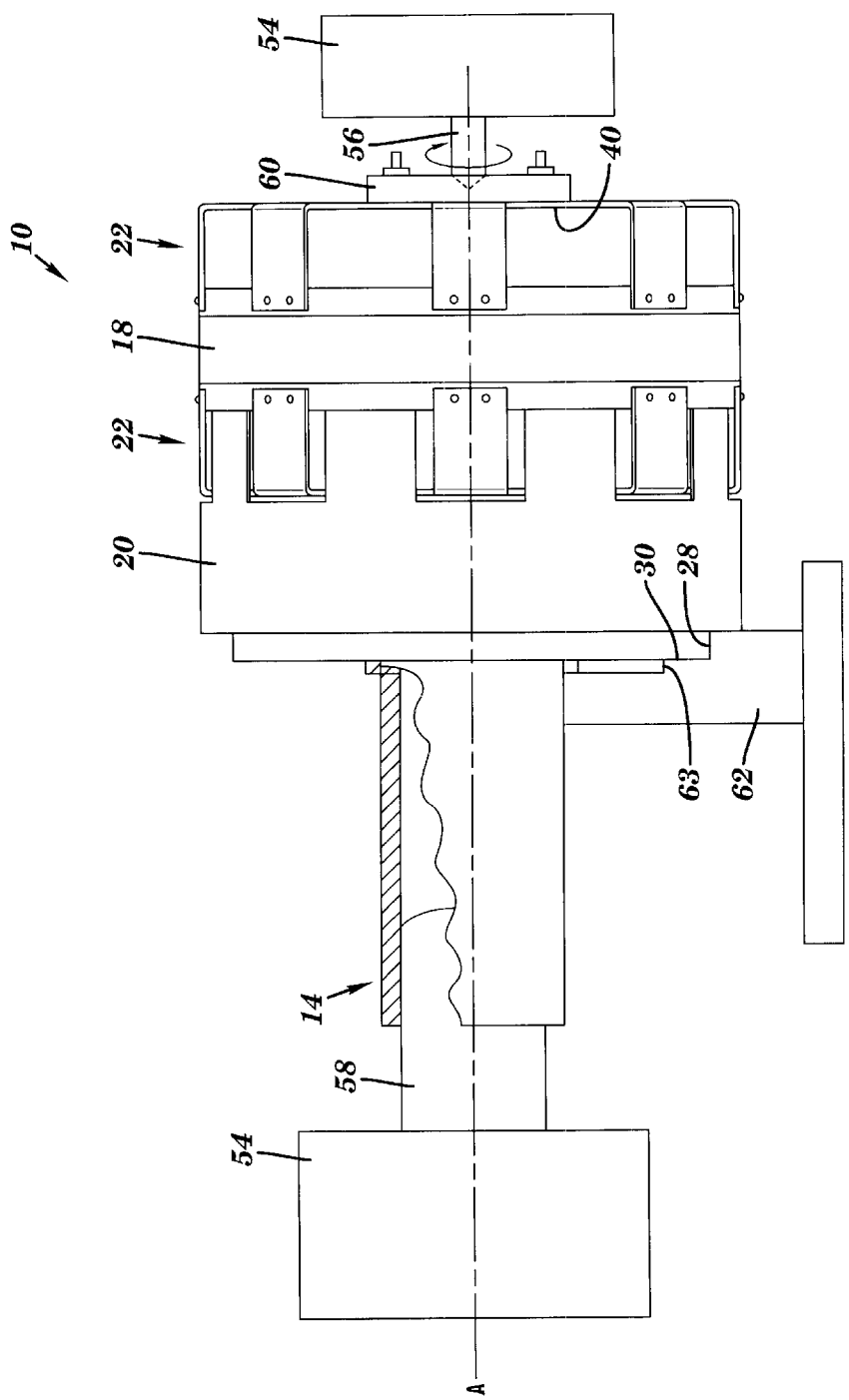
FIG. 7 shows a method in accordance with the invention.
Figure 8:
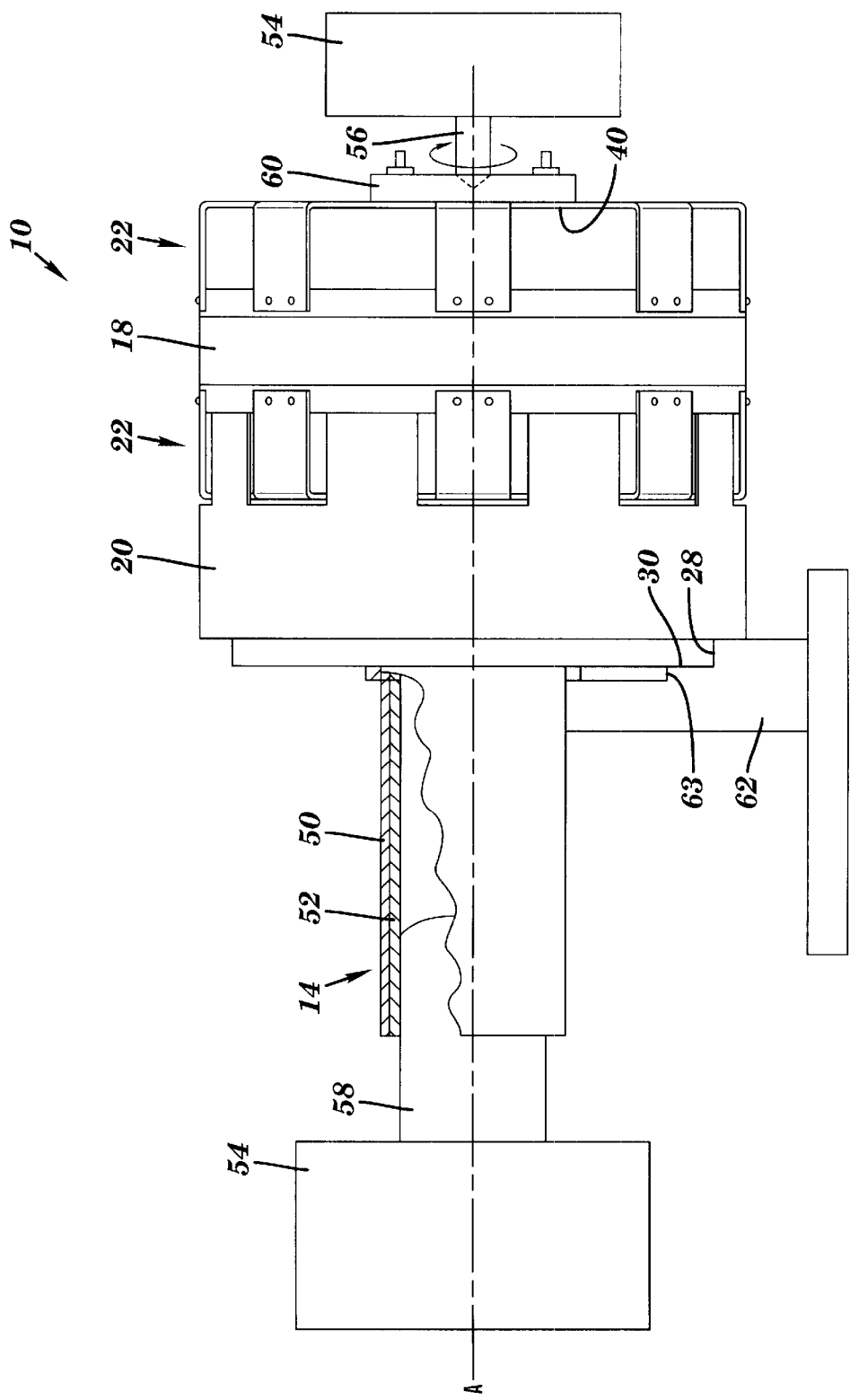
FIG. 8 shows an alternative step of the method of FIG. 7.

Referring to FIGS. 7–10, a method of constructing a reciprocator 10 and a moving element 14 of reciprocator 10 is shown. It should be understood at the outset of the description of the method that a separate reciprocator casing 20 may or may not be provided with reciprocator 10. When a reciprocator casing 20 is not provided, reciprocator 10 may include an integral machinable surface, as shown in FIG. 8. Accordingly, processes described as being conducted on reciprocator 10 should be interpreted as being applicable to a reciprocator as an integral entity or including some separable machinable surface, such as reciprocator casing 20.

A method in accordance with the invention includes connecting moving element 14 to reciprocator 10 via a suspension that allows reciprocation and substantially prevents non-axial motion of moving element 14 relative to reciprocator 10. While a particular suspension element 22 and suspension 23 have been disclosed, other suspensions that restrict non-axial motion of moving element 14 such as rotation and/or radial motion are also suitable.

Reciprocator 10 is mounted, in an assembled form shown in FIG. 7, into a lathe 54 or similar finishing machine. Lathe 54 would have an output shaft 56 or spool 58 preferably piloted to moving element 14 and hub mounting 60 of reciprocator 10, respectively. Activation of lathe 54 causes a simultaneous rotation of moving element 14 and reciprocator 10 substantially about reciprocation axis A.

As reciprocator 10 rotates, a tool 62 machines a diameter of moving element 14 and pilot 28. Additionally, if a pilot face 30 is not already present, tool 62 may include an additional cutting edge 63 to machine pilot face 30 simultaneously with the machining of moving element 14 and pilot 28. Otherwise, cutting edge 63 may be omitted.

Pilot face 30 is preferably perpendicular to moving element 14 and pilot 28. The substantial prevention of non-axial motion, e.g., rotational and radial movement, provided by suspension 23 allows transmission of cutting forces and torques between moving element 14 and reciprocator 10. Hence, both moving element 14 and reciprocator 10 can be machined to desired dimensions in one set up of machining tool 60. One machining set up thus may include cutting moving element 14 to a first outer diameter, cutting a pilot 28 to a second outer diameter, and cutting a pilot face 30 of reciprocator 10. As a result, the concentricity of pilot 28 and moving element 14, and perpendicularity of pilot face 30 and moving element 14 are assured.

A single machining operation would not be possible with prior art spiral suspensions or any form of traditional linear bearings because of the inability to withstand high torsional forces, i.e., the spiral suspensions and bearings twist in operation and cannot withstand the higher torsional forces applied during machining.

As an alternative, as shown in FIG. 8, the method may include the step of attaching a layer of material 50 to an inner member 52 of moving element 14. Attachment is preferably provided by an epoxy such as EP3203, manufactured by Ciba. Layer of material 50 has a hardness less than reciprocator 10 or casing 20 and inner member 52, and is preferably a polytetrafluorethylene (PTFE) based material such a RULON®, manufacture by Dixon. The addition of layer of material 50 further lowers the cutting forces and torques applied between moving element 14 and reciprocator 10 during manufacture. Layer of material 50 has a thickness such that machining of moving element 14 to a desired outer diameter can occur without completely removing layer of material 50. Hence, layer of material 50 creates the outer diameter of moving element 14 and aids unlubricated operation of reciprocator 10.

Most elements of reciprocator 10 that are not part of an intentional magnetic circuit in motor 18, including reciprocator casing 20; cylinder assembly 12 and moving element 14/inner member 52, are preferably made from a non-ferrous metal capable of withstanding the repetitious stresses of reciprocator 10. For instance, aluminum or magnesium are suitable.

Figure 9:
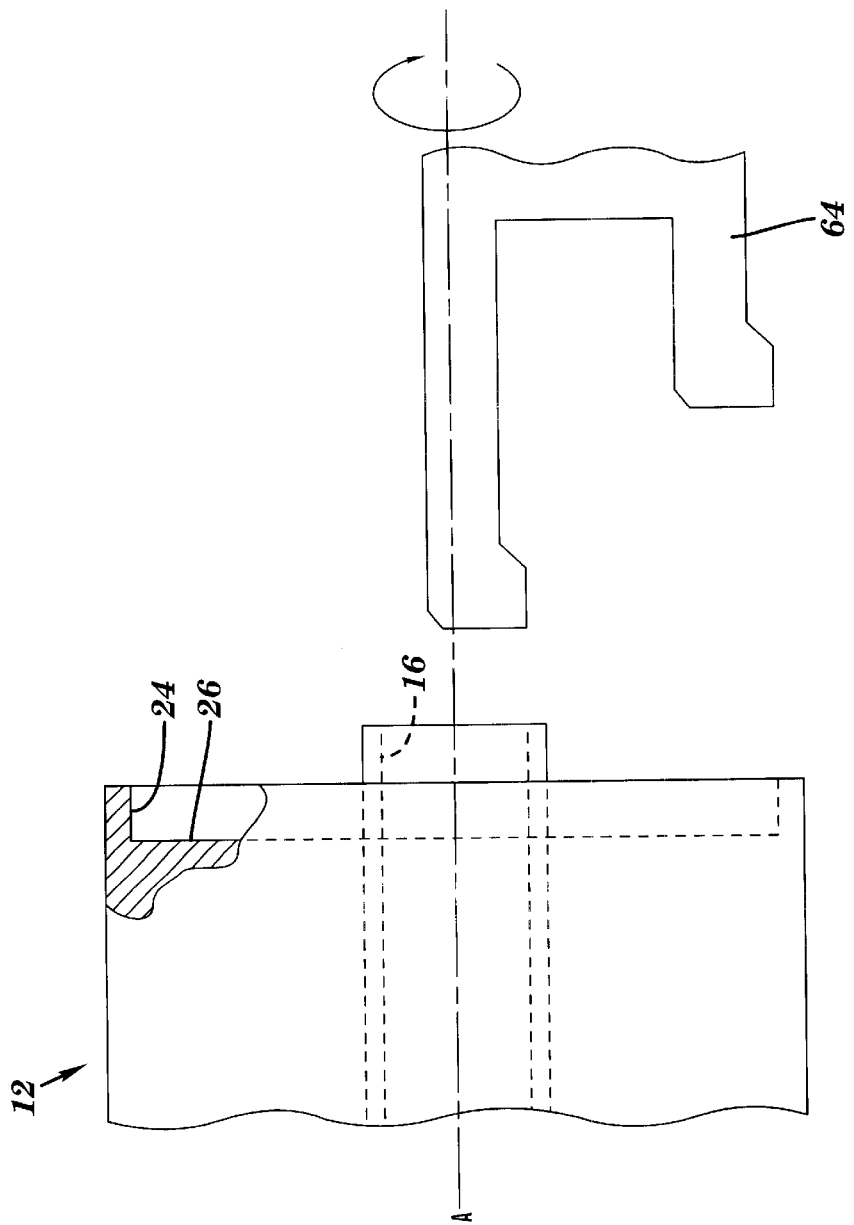
FIG. 9 shows an additional step for the method of FIG. 7.

Referring to FIG. 9, as a further step of the method, although not necessary, it is preferable that cylinder assembly 12 also be machined in a single step to assure concentricity of cylinder bore 16 and pilot bore 24, and perpendicularity of cylinder face 26 with cylinder bore 16 and pilot bore 24. Machining of cylinder assembly 12 is preferably performed by a dual boring bar 64 in a known fashion. With the additional step, the above-described method is capable of producing a close-fit, non-contacting alignment between a first element, e.g., moving element 14, coupled to a reciprocator for reciprocating movement along a reciprocation axis A, and a second element, e.g, cylinder bore 16, without requiring close-tolerance manufacturing of the component parts of the assembly.

Figure 10:
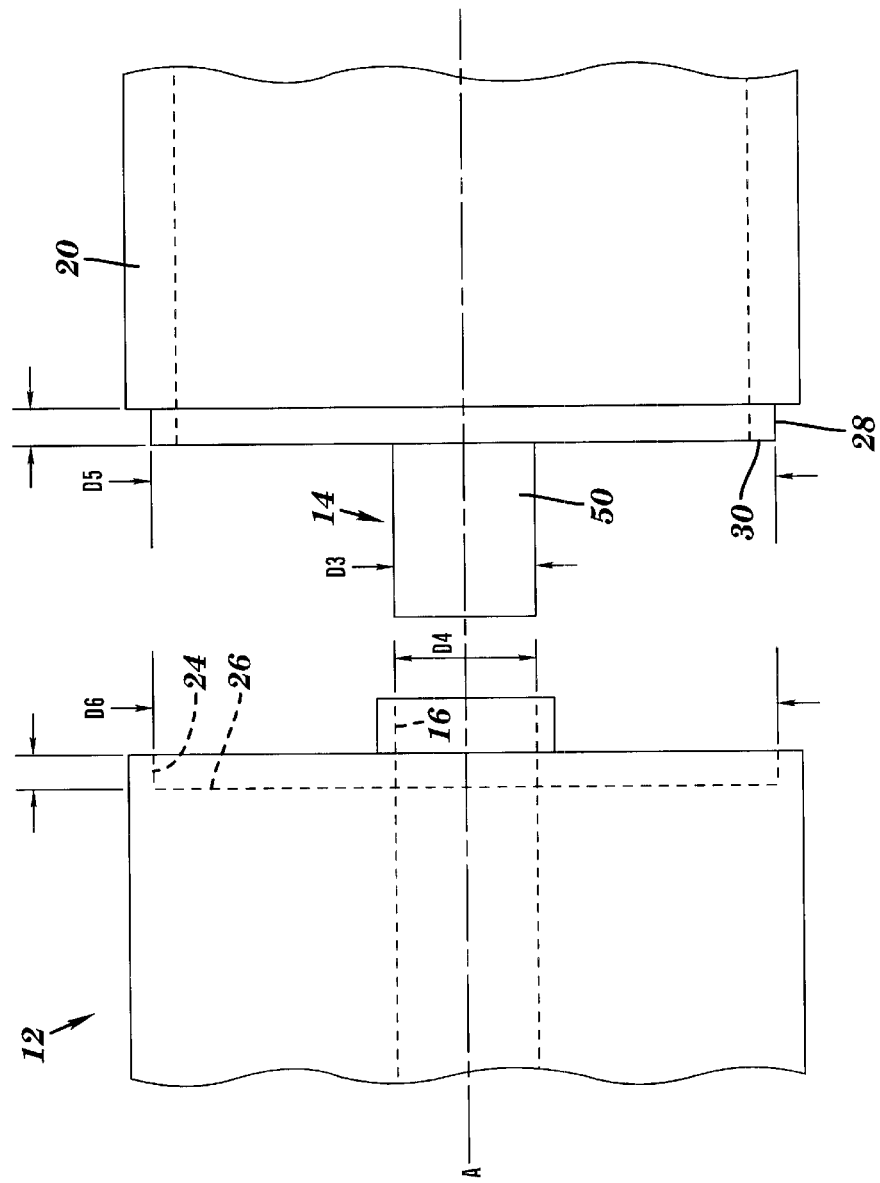
FIG. 10 shows a detail of the results of the method of FIG. 7.

As shown in FIG. 10, moving element 14 acquires an outer diameter D3 that, in an aligned manner, mates with an inner diameter D4 of cylinder bore 16. Similarly, pilot 28 has an outer diameter D5 that mates with very close or slight interference fit within inner diameter D6 of pilot bore 24. Reciprocator 10 is clamped to cylinder assembly 12, which mates cylinder face 26 and pilot face 30. Since pilot 28 and moving element 14, and cylinder bore 16 and pilot bore 24, are concentric, and mating cylinder face 26 and pilot face 30 assure angular alignment of moving element 14 and cylinder bore 16, the uninhibited movement of moving element 14 in cylinder bore 16 can be assured.

Linear suspension 23/linear suspension element(s) 22 thus provide a mechanism not only for allowing suspended reciprocation of moving element 14 in reciprocator assembly 8 during operation, but also for reacting to non-axial forces, e.g., rotational/torsional and radial forces, exerted during manufacture. The result of the above-described methods is a free-running reciprocator assembly 8 without the expense of high precision machining of individual parts to a precision greater than that required for the final assembled close-clearance running fit. The above processes also make machining of reciprocator assembly 8 quicker and mass production possible.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

I claim:

1. A linear suspension element for a reciprocating moving element, the suspension element comprising;
   a mount;
   a plurality of preloaded legs each having a first portion for coupling to a moving element, and a second portion coupled to the mount,
   whereby damage caused by continual reciprocating motion is reduced by the preload.

2. The linear suspension element of claim 1, wherein the preload is provided by each second portion being set at an angle with the first portion less than an angle of forming.

3. The linear suspension element of claim 2, wherein the angle with the first portion is less than 90°.

4. The linear suspension element of claim 1, wherein the preload is provided by an inner distance between any two opposing second portions being less than an outer distance between any two opposing sides of the mount to which the second portions are coupled.

5. The linear suspension element of claim 4, wherein the inner distance is about 1% less than the outer distance.

6. The linear suspension element of claim 4, wherein the preload is provided by each second portion being set at an angle with the first portion less than an angle of forming.

7. The linear suspension element of claim 6, wherein the angle with the first portion is less than 90°.

8. The linear suspension element of claim 4, wherein the mount includes a side for coupling to each second portion.

9. The linear suspension element of claim 4, wherein each second portion is preloaded against a fulcrum edge of each side.

10. The linear suspension element of claim 1, wherein each first portion extends substantially radially relative to the moving element and each second portion extends substantially axially relative to a reciprocation axis of the moving element.

11. The linear suspension element of claim 1, wherein the mount includes a side for coupling to each second portion.

12. The linear suspension element of claim 1, wherein the preload is provided by an average inner diameter of th second portions being less than an average outer diameter of the mount.

13. A reciprocator Comprising:
   a linear drive mechanism for linearly moving a moving element;
   at least one linear suspension element operatively coupled to the linear drive mechanism, each linear suspension element having:
      a mount;
      a plurality of legs each having a first portion for coupling to a moving element, and a second portion coupled to the mount; and
      wherein each leg includes a preload that reduces damage caused by continual reciprocating motion.

14. The reciprocator of claim 13, further comprising a reciprocator casing coupled to the linear drive mechanism.

15. The reciprocator of claim 13, wherein the preload is provided by each second portion being set at an angle with the first portion less than an angle of forming.

16. The reciprocator of claim 13, wherein the preload is provided by an inner distance between any two opposing second portions being less than an outer distance between any two opposing sides of the mount to which the second portions are coupled.

17. The reciprocator of claim 16, wherein the preload is provided by each second portion being set at an angle with the first portion less than an angle of forming.

18. The reciprocator of claim 16, wherein the mount includes a side for coupling to each second portion.

19. The reciprocator of claim 18, wherein each second portion is preloaded against a fulcrum edge of each side.

20. The reciprocator of claim 13, including two linear suspension elements.

21. A linear suspension for a moving element of a reciprocator having a linear drive mechanism for the moving element, the suspension comprising:

a first mount coupled to the linear drive mechanism;

a plurality of preloaded legs each having a first portion coupled to the moving element, and a second portion coupled to the first mount;

a second mount coupled to the linear drive mechanism; and a plurality of preloaded legs each having a first portion coupled to the moving element, and a second portion coupled to the second mount, whereby damage cause by continual reciprocating motion is reduced by the preload.

22. The reciprocator of claim 13 wherein the preload is provided by an average inner diameter of the second portions being less than an average outer diameter of the mount.

* * * * *